United States Patent [19]

Fall

[11] Patent Number: 4,706,380

[45] Date of Patent: Nov. 17, 1987

[54] DRIVER APPARATUS

[76] Inventor: James C. Fall, 9531 Melvin Ave., Northridge, Calif. 91324

[21] Appl. No.: 916,643

[22] Filed: Oct. 8, 1986

Related U.S. Application Data

[63] Continuation of Ser. No. 567,232, Dec. 30, 1983, abandoned.

[51] Int. Cl.[4] ................................................ B23Q 7/10

[52] U.S. Cl. ........................................ 29/813; 285/419

[58] Field of Search .......................... 29/813, 809, 811; 285/177, 419, 373; 140/122; 81/901

[56] References Cited

U.S. PATENT DOCUMENTS

| | | | |
|---|---|---|---|
| 295,880 | 3/1884 | Lorillard | 81/901 |
| 935,111 | 9/1909 | Jones | 285/419 |
| 1,589,917 | 6/1926 | Williams | 285/419 |
| 1,649,594 | 11/1927 | Johnson | 285/419 |
| 1,733,072 | 10/1929 | Pierce | 285/419 |
| 2,560,114 | 7/1951 | Kennon | 285/114 |
| 3,024,682 | 3/1962 | Finkle | 81/901 |
| 3,183,938 | 5/1965 | Smith et al. | 285/419 |
| 3,268,245 | 8/1966 | Wood | 285/373 |
| 4,284,298 | 8/1981 | Kaufmann | 285/373 |

FOREIGN PATENT DOCUMENTS

| | | | |
|---|---|---|---|
| 1449044 | 7/1966 | France | 285/419 |

*Primary Examiner*—Howard N. Goldberg
*Assistant Examiner*—Irene Graves Golabi
*Attorney, Agent, or Firm*—Frank L. Zugelter

[57] ABSTRACT

An improved and novel lag screw driving apparatus whereby a screw along with a hanger formed thereon is threaded into a wooden ceiling member or the like from floor level. The apparatus comprises a handle having a wire magazine, a wire magazine loader mounted above the handle and through which wires have ingress to and egress from the magazine, a head or holder for an eyescrew mounted on the magazine loader, at least one pair of longitudinally-split sleeves spaced one from another and to which tubular members forming the magazine and the magazine loader are clamped. Each of the split sleeves includes a ledge from which smaller and larger bores in opposing directions extend. A clamping means across the split of each sleeve and to each side of the ledge is provided so that handle tubing and the magazine loader which are inserted into the bores of the sleeve are secured therein. Chamfers along the split are provided.

14 Claims, 6 Drawing Figures

FIG. 2.
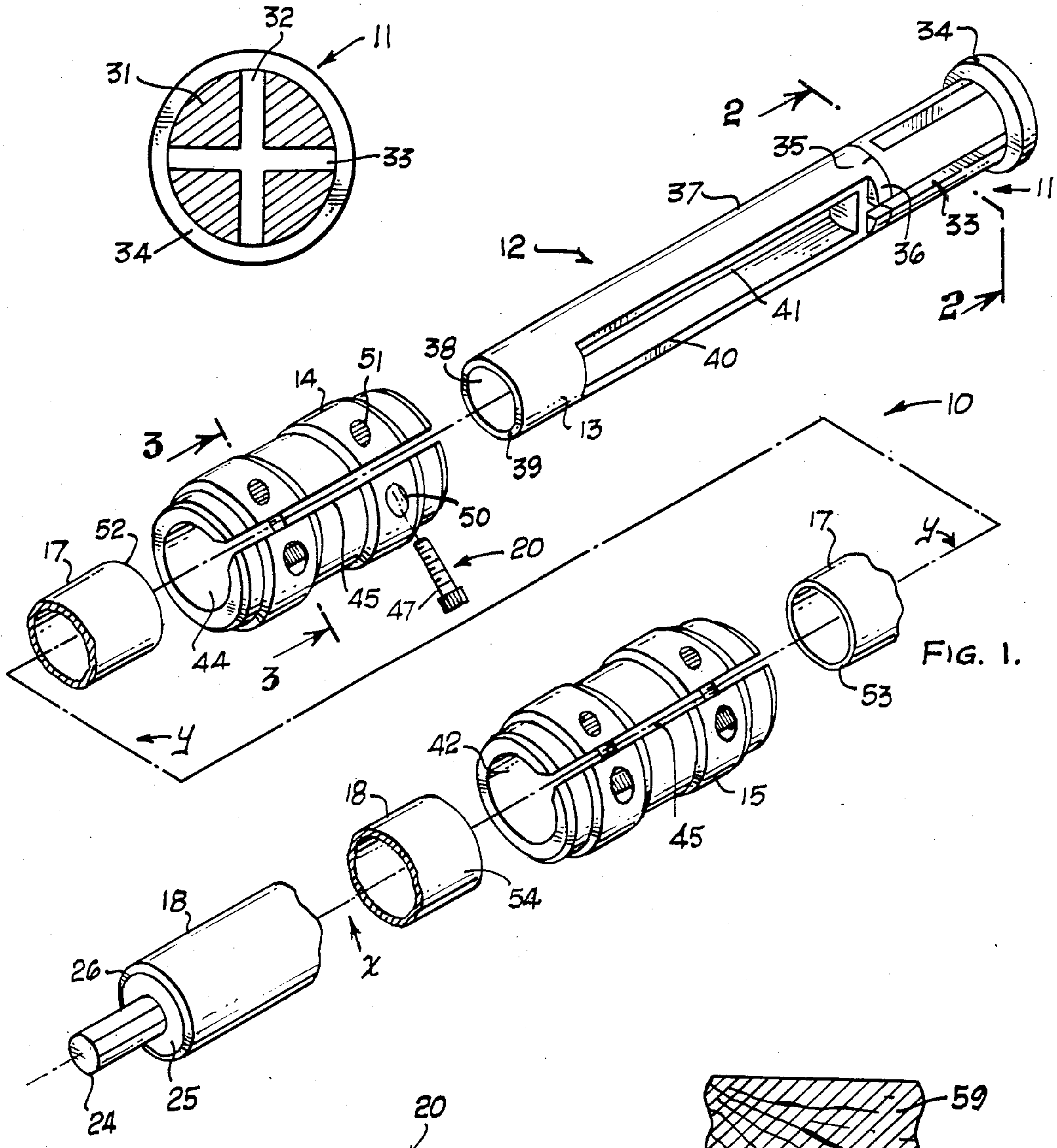
FIG. 1.
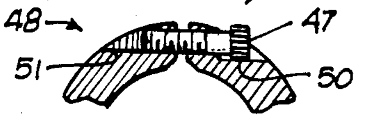
FIG. 3.
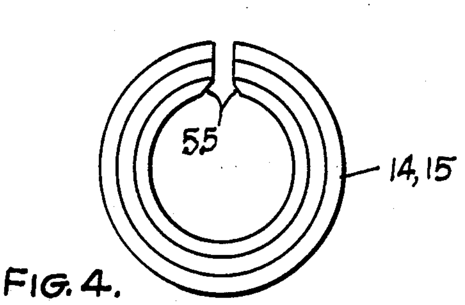
FIG. 4.
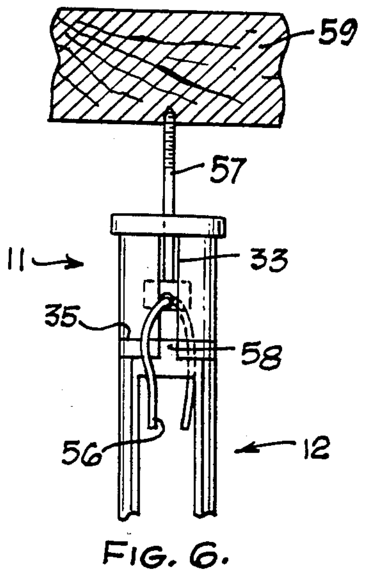
FIG. 6.

DRIVER APPARATUS

This application is a continuation application of my co-pending application Ser. No. 567,232, filed Dec. 30, 1983, now abandoned.

TECHNICAL FIELD

This invention is directed to hanging of wires from a ceiling to support false ceiling frames or the like, and in particular, to an apparatus for driving a lag screw into a ceiling member and to which screw a hanger is formed and attached.

BACKGROUND ART

See the following U.S. Letters Patent: Nos. 295,880; 882,937; 1,125,417; 3,024,682 and 3,030,984.

PROBLEMS IN PRIOR ART PRACTICES

Apparata presently used in the trade comprise elongated hollow aluminum tubing which form handles, adjacent one end of which openings are cut out in their annular walls to provide access to the interiors of the handles. These handle interiors constitute magazines for long strands of bent wires. A recessed head is securely mounted at the same end of each of the handles. A short strand of (exposed of the magazine) a bent wire removed from the magazine would be thrust into one of the recesses and through an eye of a lag screw supported in a crossing recess or slot, the bent wire thus being looped through the screw's eye. The screw then would be caused to be jammed into a wooden ceiling member and the handle caused to turn, to thereby thread the screw to the wooden member, after which the handle and head would be withdrawn to thereby cause the bent looped wire to wind or twist about the eye and itself. The result was a formed hanger mounted to the ceiling member.

Disadvantages nevertheless remained. The longer length of the bent wire would become kinked as it was withdrawn from the magazine through the small wall opening as the bent wire's short portion was thrust through the recessed head. The aluminum hollow tubing would wear out frequently by reason of the work beating it would take. Different sized left-over tubings would be fastened or riveted together at their ends to form the handle, and as a consequence, jamming of the longer portions of the wires as they were inserted through the wall opening into the magazine prior to use of the device would occur when the longer length of the wire struck an annular rim of lower-disposed tubing. With the exception of the recessed heads which are made of stronger and solid material, such as machined metal or steel, the handles in many instances would be discarded after some use. This would become an expensive proposition in the trade.

The present invention solves the noted and other problems and provides many advantages and objects not heretofore realized in state-of-the-art apparata.

SUMMARY OF THE INVENTION

An improved and novel lag screw driving apparatus whereby a screw along with a hanger formed thereon is threaded into a wooden ceiling member or the like from floor level. The apparatus comprises a handle having a wire magazine, a wire magazine loader mounted above the handle and through which wires have ingress to and egress from the magazine, a head or holder for an eye-screw mounted on the magazine loader, at least one pair of longitudinally-split sleeves spaced one from another and to which tubular members forming the magazine and the magazine loader are clamped. Each of the split sleeves includes a ledge from which smaller and larger bores in opposing directions extend. A clamping means across the split of each sleeve and to each side of the ledge is provided so that handle tubing and the magazine loader which are inserted into the bores of the sleeve are secured therein. Chamfers along the split are provided.

An object of this invention is to provide a novel apparatus for forming a hanger, and, for attaching a hanger to a ceiling member or the like.

Another object of this invention is to provide a tool with removably assembled component parts easily assembled for use and easily disassembled for storage, transportation, and substitution of parts when they wear out more often than other parts of the tool.

A further object of the invention is to provide a tool, one not liable to become inoperative, one that is adjustable or telescopic in length and one that conveniently can be mounted to the chuck of an electric hand drill.

Another object of this invention is to provide a novel clamping sleeve for utilization in the assembly of such apparatus and for utilization elsewhere wherever clamping of two members mounted in the sleeve is required, necessary or desired.

Another object of the invention is to prevent as much as possible torqueing on the apparatus which accelerates the wear of its elements.

These and other objects and advantages of the invention will become apparent by a full and complete reading of the following description, the appended claims and the accompanying drawing comprising two (2) sheets.

BRIEF DESCRIPTION OF THE DRAWING

FIG. 1 is an exploded, perspective view of the elements of the apparatus of this invention.

FIG. 2 is a view taken on line 2—2 of FIG. 1.

FIG. 3 is a view taken on line 3—3 of FIG. 1.

FIG. 4 is a view of an end of the sleeve element in the invention.

FIG. 6 is a fragmentary elevational view showing the relationship of the apparatus of the invention to a ceiling member as a lag screw is thrust into and being threaded to the latter during operation of the invention.

BEST MODE(S) FOR CARRYING OUT THE INVENTION

Figure 5:
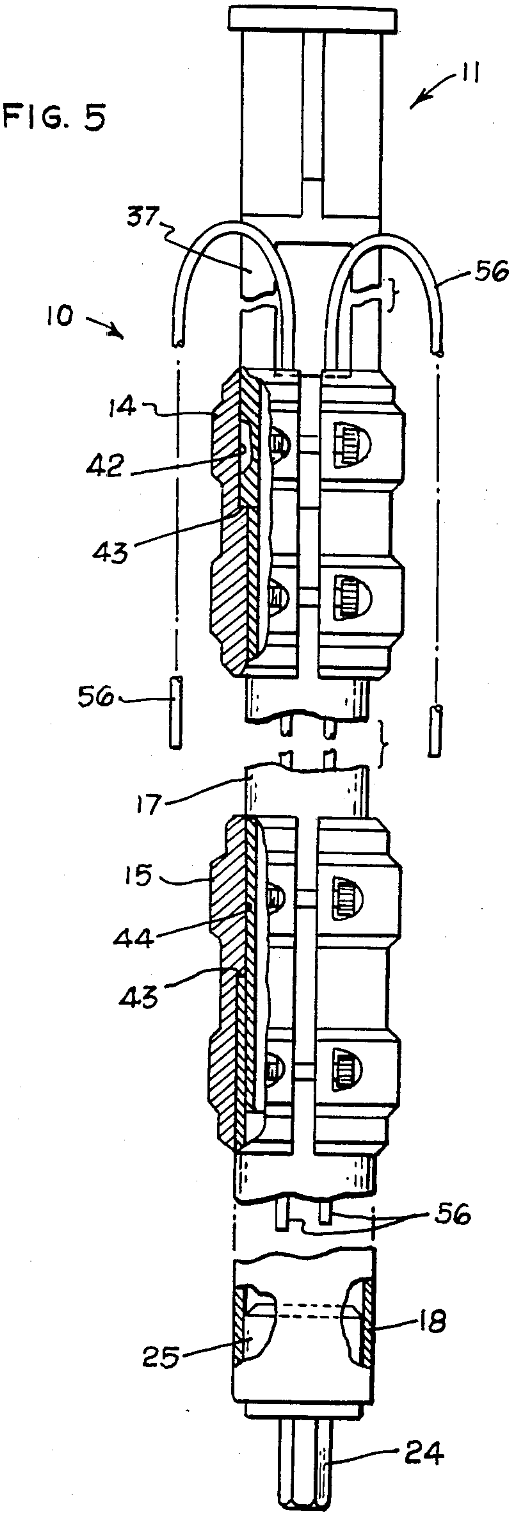
FIG. 5 is an assembled view, partly in section, and with elements abbreviated, of the apparatus of the invention.

Referring now to the drawing wherein reference characters therein correspond to like numerals hereinafter, FIGS. 1 and 5 show an apparatus 10 disclosing subject matter of this invention. Apparatus 10 comprises, generally, a recessed head 11 securely mounted on a magazine loader 12 having a base support member 13 which slip-fits into one portion of a longitudinally-split sleeve 14, a second longitudinallysplit sleeve 15 spaced from sleeve 14 and operatively connected therewith by a first hollow member 17 the opposing terminal portions of which being slip fit to their corresponding sleeves 14, 15, and a second hollow member 18 mounted to sleeve 15 in the same general manner as member 17 and magazine loader 12 are mounted to their sleeves.

Clamping means 20 are mounted in each sleeve 14, 15, across their splits, for clamping sleeves and hollow members together in the assembly of apparatus 10. A tang 24 is suitably attached to a small cylindrical plug 25 press fit to hollow member 18 adjacent its one annular end 26.

The recessed head 11 shown in FIGS. 1 and 5 is a state-of-the-art element, to which per se no claim is made. Head 11 comprises a cylindrical member 31, FIGS. 1, 2, having a pair of longitudinally-disposed slots or recessed passageways 32, 33 mounted therein. Passageways 32, 33 are slotted throughout the diametrical dimension of member 31, crossing one another in a generally cross-like formation, with an annular ring 34 welded at the upper terminal end or top of member 31. Preferably, head 11 is machined in one piece with magazine loader 12. However, should head 11 be made separately from magazine loader 12, as suggested by a weld line 35, FIG. 1, it is secured by welding to a top element 36 on loader 12, after which slot or passageway 33 is extended by machining through top element 36, FIG. 1, and before ring 34 is mounted to head 11.

Magazine loader 12 comprises an elongated, preferably cylindrical, member 37 having a hollow chamber 38 extending from top element 36 to and through an annular rim 39 for base support member 13. A pair of opposing doorways 40, 41 are cut out of member 37 for ingress and egress to its hollow chamber 38, extending from top element 36 to a point in member 37 at which support base member 13, in the form of an annular wall, is formed. Annular wall 13 terminates at rim 39. Support base member 13 is adapted for fitting to sleeve 14 in the assembly of apparatus 10.

It may be noted here that a similar type of loader 12 integrally combined with a head 11 is a state-of-the-art element, however, it includes an internally-threaded portion in its support base member 13 which then is threaded directly to a complementary externally-threaded portion on and at the top of an ordinary hollow aluminum tubing functioning as a handle. In this invention, however, such threaded portions are entirely eliminated, and magazine loader 12 is secured in a different manner as will become apparent in a reading of this disclosure.

Support base member 13 is operatively connected to sleeve 14, by being slip-fit into a complementary bore 42, FIG. 5, formed in a length or portion for sleeve 14, preferably about one-half of its entire length. Annular rim 39 on base 13 seats upon a ledge 43 formed in sleeve 14 and by the formation of which ledge 43 a smaller bore 44 FIG. 1, is formed in the remaining length or portion for sleeve 14. Preferably, as annular rim 39 seats on ledge 43, one half of the thickness of such annular rim 39 seats on the ledge proper and one half of such thickness extends radially inwardly to project within a geometrical extension of the circumference of the smaller bore 44. See FIG. 5. Thus, sleeve 14 has one bore 42 larger than its other bore 44, with a ledge 43 separating such bores. Sleeve 15 is congruous in its configuration to that of sleeve 14.

Each sleeve 14, 15 includes a longitudinally-extending split 45 cut along the entire length of its annular body and throughout its thickness. In each of the annular portions of each sleeve 14, 15 containing bores 42, 44, a clamping means 20 is provided transversely across split 45 whereby such split can be lessened. Each clamping means 20 comprises a bolt 47 extending through an opening 48, FIG. 3, formed by a pair of holes 50, 51 in alignment with each other. Each opening 48 is disposed in portions of the sleeve's annular body which correspond to the formation of the larger bore 42 and to the formation of the smaller bore 44. The body formation and dimensions of opening 48 do not interfere with the dimensions of either bore 42, 44 in each sleeve 14, 15. One hole, 50 is bored out, while the other hole 51 in alignment therewith is threaded for engagement with the threads of bolt 47. Thus, bolt 47 lessens split 45 as it is turned in one direction and releases the closeness of the split 45 when turned in the other direction, to effectively cause a corresponding clamping and unclamping upon any slipfit element disposed in a bore 42, 44.

As shown in FIGS. 1, 5, sleeves, 14, 15 are spacedly disposed to each other, along the length of the handle forming apparatus 10. Opposing end portions of member 17 are mounted by slip-fit in the corresponding smaller bores 44 of each sleeve 14, 15. The one annular end 52, FIG. 1, of member 17 seats against a partial thickness of annular rim 39 on base support member 13 of magazine loader 12 and which projects radially inwardly as described above. The respective interior wall surfaces of member 17 and base support member 13 are flush with one another in assembly, thereby eliminating jamming of wires introduced via doorways 40, 41 into the handle magazine formed in assembly of the apparatus.

The portion of member 17 on which its other annular end 53, FIG. 1, is integrally mounted slip-fits to the smaller bore 44 of sleeve 15. Here, it is to be noted that member 17 is slidably mounted to sleeve 15 so that it can also slide into and be adjustable in its position within the dimensions of its larger bore 42; i.e., telescopic in nature.

The second hollow member 18 is mounted to sleeve 15 by its terminal portion 54 being slip-fitted to its larger bore 42, to seat against its ledge 43. The wall thickness of member 18 does not exceed the dimensioned thickness of annular ledge 43 in order for the noted adjustability-of-length and telescopic features for member 17, as well as eliminating jamming of wires introduced ino the magazine. Member 17 can slide into the larger bore 42 of sleeve 15, to continue sliding, if necessary or desired, to abut tang 24 prior to clamping sleeve and hollow members.

A pair of chamfered surfaces 55, FIG. 4, are machined along the spaced edges and at the intersections with the interior surfaces of each sleeve 14, 15 forming its respective longitudinal split. These surfaces 55 extended throughout the length of each sleeve and prevent binding between sleeve and hollow members during assembly and disassembly, as foreign material, metal burrs, and the like may cause binding without such chamfers.

In the assembly of apparatus 10, annular rim 39 on base support member 13 of magazine holder 12 is inserted into the upperly disposed larger bore 42 of sleeve 14, FIG. 5 to seat on its ledge 43. The one end 52 of smaller-dimensioned member 17 is introduced into the opposing bore 44 of sleeve 14 to seat upon the partial thickness of annular rim 39 of magazine loader 12 and which projects radially inwardly to form such a seat. Thereafter, bolts 47 are tightened, via an Allen wrench, in sleeve 14 against their threaded holes 51 to clamp sleeve 14 to magazine holder 12 and hollow member 17.

The other end 53 of member 17 is slip-fitted to smaller bore 44 of sleeve 15, and the non-tanged end of the secondhollow member 18 is slip-fitted into the larger bore 42 of sleeve 15 to seat on its ledge 43. The member 17 is slidable to a desired position, within or without the internal dimension of member 18, or to as far as its plug 25. Thereafter, bolts 47 in sleeve 15 are threaded against threaded holes 51 to clamp sleeve 15 to members 17 and 18.

After this assembly, the one bolt 47 in sleeve 18 may be temporarily loosened to provide re-positioning of member 17 relative to sleeve 15 and member 18, thereby adjusting the length of the handle of apparatus 10 to any necessary or desired length.

In operation, a plurality of wires 56 have their longstranded ends inserted through one or both doorways 40, 41 of loader 12 and into the handle magazine for apparatus 10 formed in the assembly described above. These deposited and stored wires in such magazine are immediately accessible during the apparatus' use. Each of these wires are bent over or looped so as to form a short strand of wire and which short strand hangs down outside of and along sleeve 14 and member 17. The end of a short strand of one of these looped wires is then taken by hand and thrust through recess or slot 33 of head 11 and through the eye of a lag screw 57, FIG. 6, which has been inserted into recess 32 and supported therein on a base face 58, FIG. 6, formed in head 11 in alignment with recess 32. The loop of wire 56 thus seats within the eyelet of lag screw 57. With end of lag screw 57 projecting out of head 11, apparatus 10 is taken in hand and pushed towards a wooden ceiling member 59, FIG. 6, to jam screw 57 into it. Tang 24, FIGS. 1, 5, is caused to rotate, such as by a direct connection to a chuck on an ½ inch electric drill (not shown). As the motor of the drill causes chuck and tang 24 to rotate slowly (say, 0–500 rpm), the entire apparatus 10 rotates slowly, the operator holding the electric drill assembly (not shown). Lag screw 57 is caused to thread into ceiling member 59 as this occurs. After screw 57 is sufficiently threaded into wooden member 59, the operator withdraws apparatus 10 and head 11 from lag screw 57. Immediately, the short and long strands of looped wire 56 twist upon themselves. When the twisted short strand of the looped wire is free from slot 33 in the head, the rotation of apparatus 10 is stopped, and it is lowered until the wire's long strand passes out of slot 33 and is free of head 11. The operation again is repeated elsewhere where necessary, and as often as necessary.

It should be noted that the lengths of doorways 40, 41 in magazine loader 12 are sufficiently long so that an easy pull of wire from its handle magazine occurs along with ease of seating the loop of the wire to the eyelet of screw 57. On the other hand, the elongated arms on loader 12 separating such doorways should not be too long as then a weakness or bending due to torque may occur on the arms in the operation of the device.

The material out of which the elements are made may be of suitable nature. For example, standard-sized aluminum tubing for members 17, 18 can be used. Sleeves 14, 15 are machined or cast out of aluminum. Magazine loader 12 and head 11 are made of steel.

It may be noted in FIGS. 1, 5 that bolts 47 are shown to be threaded to sleeve 15 in the same direction (in the drawing sheet) as the direction of threading are shown for bolts 47 in sleeve 14, although sleeves 14, 15 are in reversed relationship to one another. The present mode of manufacture makes not only sleeves 14, 15 congruous members, but also makes the configurations of elements 48, 50 and 51 of clamping means 20 in sleeve 14 congruous with those in sleeve 15. Although these elements in are shown not to be congruous in FIGS. 1, 5, from sleeve 14 to sleeve 15 and vice versa, such depiction is presented to illustrate merely that such changes are readily available for any set of sleeves 14, 15. In the present process of manufacture, both holes 50, 51 for each opening 48 are first tapped out (threaded) and then hole 50 further bored out to remove its threads. The illustrations of FIGS. 1, 5 show the ready use for this change in otherwise congruous configurations for sleeve and clamping means, should an operator desire to have all heads of bolts 47 on one side of apparatus 10 for ease in clamping and unclamping the sleeves with an Allen wrench by the same hand of the operator while the other hand is grasping the pole 10.

It should now be apparent that apparatus 10 is not limited to but a pair of sleeves 14, 15 and one member 17 and one member 18, as illustrated by the drawing. Additional members and different forms for a sleeve 14, 15, along with compensating additional hollow tubing members, may be utilized.

A sleeve 14, 15 may be formed with a rib separating two bores each of which is the same size as the other. The rib would be annular in character or configuration, extending radially inwardly from the interior wall surfaces forming the two bores of the same size, and disposed generally in the central portion of the length of the sleeve, as, for example, like that of ledge 43. The rib would be formed either by casting or machining (boring from opposite ends of a solid cylindrical member to form the sleeve). Each side of the rib functions as a ledge or shelf for seating the annular rim of a hollow handle element 17 or 18, and preventing too much of one hollow handle element from being disposed in the sleeve in order while the other not being sufficiently disposed in the same sleeve to gain the effect of its corresponding clamping means 20. If these two bores are the size for the larger hollow handle element 18, then the sleeve would be used at reference character x, FIG. 1, below the position of sleeve 15, with a member 18 extending out of each of its bores. The advantage gained here is the telescopic extension and shortening of the pole or apparatus 10, by reason of the particular length of element 17, which can slip through such sleeve all the way to plug 25. Thus, hollow element 17 can be of a longer length, and the pole still be adjustable to a shorter length.

If these two bores on each side of the rib are the size for the smaller hollow handle element, then the sleeve would be disposed at the point y (two places of reference, FIG. 1), with a member 17 extending out of each of its bores. Here, no adjustability between the two sleeves 14, 15 is obtained but merely a lengthening of the pole or apparatus.

Such a rib may also be utilized to separate two bores which are not of the same size.

Also, it should now be apparent that an improvement exists in a clamping sleeve 14, 15 by virtue of a common bore throughout its length, the clamping means 20 spacedly disposed along such length, the longitudinal split in the sleeve and the chamfered surfaces 55, and which may be adapted readily for various uses.

Various changes and modifications can be made without departing from the spirit and scope of the invention and the following appended claims.

What I claim as patentably distinct is:

1. In an apparatus for forming a hanger and having a hollow handle constituting a magazine for a wire to be formed into a hanger, a magazine loader having at least one doorway accessing the magazine, and a recessed head securely mounted on the magazine loader for retaining an eye screw, the wire adapted to pass through the eye of the screw supported in said recessed head, the improvement comprising at least two sleeves each being longitudinally split and spaced one from the other in the apparatus, each sleeve including a large bore and a small bore and a ledge separating such bores, an annular support member on said magazine loader mounted within the large bore of a first one of said sleeves to seat on its ledge, a first-sized hollow handle element having its opposing ends mounted within the small bore of said sleeves, a second-sized hollow handle element mounted within the large bore in a second one of said sleeves to seat on its ledge, the first-sized handle element telescopically adjustable within the second-sized hollow handle element, means in each of said split sleeves for clamping its corresponding sleeve across its corresponding split to such first and second hollow elements and to said annular support member to secure them together as such apparatus, and a chambered surface in each of said sleeves along the spaced edges intersecting the interior wall surfaces forming its longitudinally-disposed split.

2. In the apparatus of claim 1, means securely mounted on said second member for rotating said apparatus.

3. Each clamping means of the apparatus of claim 1 comprising aligned holes forming an opening transversely disposed in each of said sleeves across its split in said annular body, and a threaded bolt for said opening, one of said holes in said opening being threaded so that its corresponding bolt threaded thereto clamps and unclamps said sleeve.

4. An apparatus for forming a hanger from wire and comprising (1) a recessed head for supporting a screw having an eyelet exposed in one of the recesses in said head for introduction of a wire therethrough, (2) a magazine loader having at least one doorway securely mounted to said head, (3) an annular suport member securely mounted on said magazine loader, and (4) a hollow handle constituting a magazine for wire accessed thereto through said magazine loader, said handle comprising at least two sleeves each being longitudinally split and spaced one from the other in the apparatus, each sleeve including a large bore and a small bore and a ledge separating such bores, an annular support member on said magazine loader mounted within the large bore of a first one of said sleeves to seat on its ledge, a first-sized hollow handle element having its opposing ends mounted within the small bores of said sleeves, a second-sized hollow handle element mounted within the large bore in a second one of said sleeves to seat on its ledge, the first-sized handle element telescopically adjustable within the second-sized hollow handle element, means in each of said split sleeves for clamping its corresponding sleeve across its corresponding split to such first and second hollow elements and to said annular support member to secure them together as such apparatus, and chamfered surfaces in each of said sleeves along the spaced edges intersecting the sleeves' interior wall surfaces forming their longitudinally-disposed splits.

5. The apparatus of claim 4 including means securely mounted on said second member for rotating said apparatus.

6. The rotating means of claim 5 being a tang secured to end of said second member.

7. The apparatus of claim 4 wherein each of said clamping means comprises aligned holes forming an opening transversely disposed in each of said sleeves across its split in said annular body, and a threaded bolt for said opening, one of said holes in said opening being threaded so that its corresponding bolt threaded thereto clamps and unclamps said sleeve.

8. In an apparatus for forming a hanger and having a hollow handle constituting a magazine for a wire to be formed into a hanger, a magazine loader having at least one doorway accessing the magazine, and a recessed head securely mounted on the magazine loader for retaining an eye screw, the wire adapted to pass through the eye of the screw supported in said recessed head, the improvement comprising at least two sleeves each being longitudinally split and spaced one from the other in the apparatus, each sleeve including a large bore and a small bore and a ledge separating such bores, an annular support member on said magazine loader mounted within the lage bore of a first one of said sleeves to seat on its ledge, a first-sized hollow handle element having its opposing ends mounted within the small bore of said sleeves, a second-sized hollow handle element mounted within the large bore in a second one of said sleeves to seat on its ledge, the first-sized handle element telescopically adjustable within the second-sized hollow handle element, and means on each of said split sleeves for clamping its corresponding sleeve across its corresponding split to such first and second hollow elements and to said annular support member to secure them together as such apparatus.

9. In the apparatus of claim 8, means securely mounted on said second member for rotating said apparatus.

10. Each clamping means of the apparatus of claim 8 comprising aligned holes forming an opening transversely disposed in each of said sleeves across its split in said annular body, and a threaded bolt for said opening, one of said holes in said opening being threaded so that its corresponding bolt threaded thereto clamps and unclamps said sleeve.

11. An apparatus for forming a hanger from wire and comprising (1) a recessed head for supporting a screw having an eyelet exposed in one of the recesses in said head for introduction of a wire therethrough, (2) a magazine loader having at least one doorway securely mounted to said head, (3) an annular support member securely mounted on said magazine loader, and (4) a hollow handle constituting a magazine for wire accessed thereto through said magazine loader, said handle comprising at least two sleeves each being longitudinally split and spaced one from the other in the apparatus, each sleeve including a large bore and a small bore and a ledge separating such bores, an annular support member on said magazine loader mounted within the large bore of a first one of said sleeves to seat on its ledge, a first-sized hollow handle element having its opposing ends mounted within the small bores of said sleeves, a second-sized hollow handle element mounted within the large bore in a second one of said sleeves to seat on its ledge, the first-sized handle element telescopically adjustable within the second-sized hollow handle element, and means on each of said split sleeves for clamping its corresponding sleeve across its corresponding split to such first and second hollow elements and to said annular support member to secure them together as such apparatus.

12. The apparatus of claim 11 including means securely mounted on said second member for rotating said apparatus.

13. The rotating means of claim 12 having a tang secured to the end of said second member.

14. The apparatus of claim 11 wherein each of said clamping means comprises aligned holes forming an opening transversely disposed in each of said sleeves across its split in said annular body, and a threaded bolt for said opening, one of said holes in said opening being threaded so that its corresponding bolt threaded thereto clamps and unclamps said sleeve.

* * * * *

UNITED STATES PATENT AND TRADEMARK OFFICE
CERTIFICATE OF CORRECTION

PATENT NO. : 4,706,380

DATED : November 17, 1987

INVENTOR(S) : James C. Fall

It is certified that error appears in the above-identified patent and that said Letters Patent is hereby corrected as shown below:

In col. 7, line 28, "chambered" should be read as --chamfered--.

In col. 8, line 17 before "end" insert --the--.

In col. 8, line 40, "lage" should be read as --large--.

Signed and Sealed this

Twelfth Day of April, 1988

*Attest:*

DONALD J. QUIGG

*Attesting Officer*

*Commissioner of Patents and Trademarks*